US012035764B1

(12) United States Patent
Ames

(10) Patent No.: US 12,035,764 B1
(45) Date of Patent: Jul. 16, 2024

(54) ZIPPER PATH FOR A HAZARDOUS MATERIALS PROTECTION SUIT

(71) Applicant: Blauer Manufacturing Company, Inc., Boston, MA (US)

(72) Inventor: Thomas W Ames, Newton, MA (US)

(73) Assignee: Blauer Manufacturing Company, Inc., Boston, MA (US)

( * ) Notice: Subject to any disclaimer, the term of this patent is extended or adjusted under 35 U.S.C. 154(b) by 0 days.

(21) Appl. No.: 18/065,818

(22) Filed: Dec. 14, 2022

Related U.S. Application Data

(62) Division of application No. 16/781,289, filed on Feb. 4, 2020, now abandoned.

(51) Int. Cl.
*A41D 13/02* (2006.01)
*A41D 13/00* (2006.01)
*A44B 19/32* (2006.01)
*A62B 17/00* (2006.01)

(52) U.S. Cl.
CPC ......... *A41D 13/02* (2013.01); *A41D 13/0005* (2013.01); *A44B 19/32* (2013.01); *A62B 17/006* (2013.01)

(58) Field of Classification Search
CPC ......... A41S 13/02; A41S 13/012; A62B 17/00
See application file for complete search history.

(56) References Cited

U.S. PATENT DOCUMENTS

| | | | |
|---|---|---|---|
| 2,505,239 A | 3/1949 | Goldstein | |
| 3,185,149 A | 2/1965 | Rentsch | |
| 3,675,244 A | 7/1972 | Mayo et al. | |
| 3,736,595 A * | 6/1973 | Siegmann | A41D 13/1218 2/457 |
| D245,817 S | 9/1977 | Smalley | |
| 4,985,933 A | 1/1991 | Lemoine | |
| 6,032,285 A | 3/2000 | Densen | |
| 6,715,160 B2 | 4/2004 | Crye et al. | |

(Continued)

FOREIGN PATENT DOCUMENTS

| | | | | |
|---|---|---|---|---|
| CA | 262025 A1 | 3/2007 | | |
| EP | 2829304 A1 * | 1/2015 | | A62B 17/006 |
| WO | 2020/0109742 A1 | 6/2020 | | |

OTHER PUBLICATIONS

Office Action for U.S. Appl. No. 16/781,289 dated Sep. 27, 2021.

(Continued)

*Primary Examiner* — Patrick J. Lynch
(74) *Attorney, Agent, or Firm* — Altman & Martin; Steven K Martin

(57) ABSTRACT

A zipper path for a non-encapsulating hazardous materials protection suit that has a first section extending generally vertically on the torso and a second section extending generally vertically on the torso, each section curving outwardly to a neck section that circles the suit neck. Segments of the first and second sections are less than the width of the neck section apart so that only a small number of snips from scissors is needed to sever the suit along a cut line that extends horizontally between the segments. One or both sections can extend down to a leg for ease in doffing the suit. Optionally, the zipper has a protective overlap. To doff the suit, the zipper is disengaged, the suit is cut with scissors at the cut line to separate the suit bottom from the hood, and the suit bottom is removed, followed by the hood.

7 Claims, 7 Drawing Sheets

(56) References Cited

U.S. PATENT DOCUMENTS

| | | | | |
|---|---|---|---|---|
| D847,464 | S | 5/2019 | Oliver et al. | |
| 2001/0008027 | A1 | 7/2001 | Duplock | |
| 2003/0190594 | A1* | 10/2003 | Teta | G09B 25/00 434/365 |
| 2008/0216218 | A1* | 9/2008 | McKinney | A62D 5/00 2/457 |
| 2009/0100557 | A1 | 4/2009 | Insulan | |
| 2017/0020311 | A1 | 1/2017 | Dubois et al. | |
| 2017/0027254 | A1 | 2/2017 | Meyerscough | |
| 2017/0066583 | A1* | 3/2017 | Kimbrough | A61K 33/18 |
| 2017/0100613 | A1* | 4/2017 | Chessari | A62B 17/04 |
| 2017/0360119 | A1 | 12/2017 | Myerscough et al. | |
| 2018/0271196 | A1 | 9/2018 | Hussey et al. | |
| 2018/0304106 | A1 | 10/2018 | O'Leary et al. | |
| 2022/0371707 | A1* | 11/2022 | Zou | B63C 9/1055 |

OTHER PUBLICATIONS

Office Action for U.S. Appl. No. 16/781,289 dated Dec. 17, 2021.
Advisory Action for U.S. Appl. No. 16/781,289 dated Feb. 23, 2022.
Advisory Action for U.S. Appl. No. 16/781,289 dated Apr. 18, 2022.
Office Action for U.S. Appl. No. 16/781,289 dated May 18, 2022.
Office Action for U.S. Appl. No. 16/781,289 dated Oct. 5, 2022.

* cited by examiner

ZIPPER PATH FOR A HAZARDOUS MATERIALS PROTECTION SUIT

STATEMENT REGARDING FEDERALLY SPONSORED RESEARCH OR DEVELOPMENT

The research involved in this application was funded in part by Combating Terrorism Technical Support Office, contract number 18-C-3034, dated January 2018. The intellectual property rights of the applicant and the government of the United States of America are governed by Title 37 Code of Federal Regulations Part 401.

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to suits for protection against hazardous materials and chemical and biological warfare agents, and more particularly to methods and apparatuses for safely removing such suits when possibly contaminated.

2. Description of the Related Art

A hazardous materials protection (hazmat) suit is a piece of personal protective equipment that consists of a whole-body garment worn as protection against potentially hazardous chemical, biological, and radiological materials, depending on the suit materials. The suit is worn with an air-purifying respirator (APR), a powered air-purifying respirator (PAPR), or a self-contained breathing apparatus (SCBA) to ensure a supply of breathable air. With a fully encapsulating suit, the SCBA system and face piece are fully contained inside the suit. With a non-encapsulating suit, the SCBA tank and harness are worn on the outside of the suit with the face piece, regulator, and air tube also on the outside. If a non-encapsulating suit is worn with an APR or PAPR system, the face piece, filter(s), and any powered components are worn on the outside of the suit.

Typically, a waterproof and/or air-tight zipper is used to as a closure. The zipper can run vertically from the neck to the waist, horizontally across the chest or back, or diagonally from a shoulder or side of the hood to the opposite leg.

When removing a potentially contaminated suit, standard protocol calls for the face piece of the SCBA to be removed last during the decontamination process. This is to ensure that the user's respiratory system is not exposed to hazardous materials during the doffing process. For the user of a fully encapsulating suits, this is not an issue because the user steps out of the fully encapsulating suit with the SCBA system on post decontamination.

The challenge has always been how to do this cleanly when wearing a non-encapsulating suit. With the goal of having the wearer keep the face piece on until the very last step of decontamination, teams have struggled with complicated cut out procedures that typically involve making cuts through the hood itself with direct contact to the user's head.

BRIEF SUMMARY OF THE INVENTION

The present invention is a unique zipper path for a non-encapsulating hazardous materials protection (hazmat) suit that enables cleaner and easier doffing of the suit after decontamination. The zipper path has a first section extending generally vertically on the torso and a second section extending generally vertically on the torso. The sections curve outwardly to a neck section that circles around the suit neck. In one configuration, the first and second sections are on the front of the torso and the neck section circles around the back of the neck. In another configuration, the first and second sections are on the back of the torso and the neck section circles around the front of the neck.

Segments of the first and second sections are in close proximity to each other. The distance between the segments is less than the width of the neck section and such that only a small number of short snips from a pair of scissors are needed to completely sever the suit.

A cut line extends horizontally at least between the first and second segments. The cut line may extend beyond the segments. The cut line can be an imaginary line, or a visible line printed or inscribed on the suit.

The path is unique because, once the user exits decontamination, the zipper can be disengaged, and scissors used to quickly cut along the cut line to allow the suit bottom to drop away from the user for easy doffing. The user will still have the suit hood/face piece on with the SCBA or APR/PAPR face piece securely in place and connected to the air supply or filter canister. An optional internal neck gasket can prevent ambient air from reaching the user after the suit is doffed.

In order to more easily doff the suit, the zipper path can extend downwardly toward the legs. Either one section can extend diagonally down to the opposite leg or each section can extend downwardly to the leg on the same side. Any extensions of the sections that ease doffing of the suit can be employed.

Optionally, the zipper has a protective overlap.

To doff the suit, the zipper is disengaged, the suit is cut with scissors at the cut line to separate the suit bottom from the hood, and the suit bottom is removed, followed by the hood.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
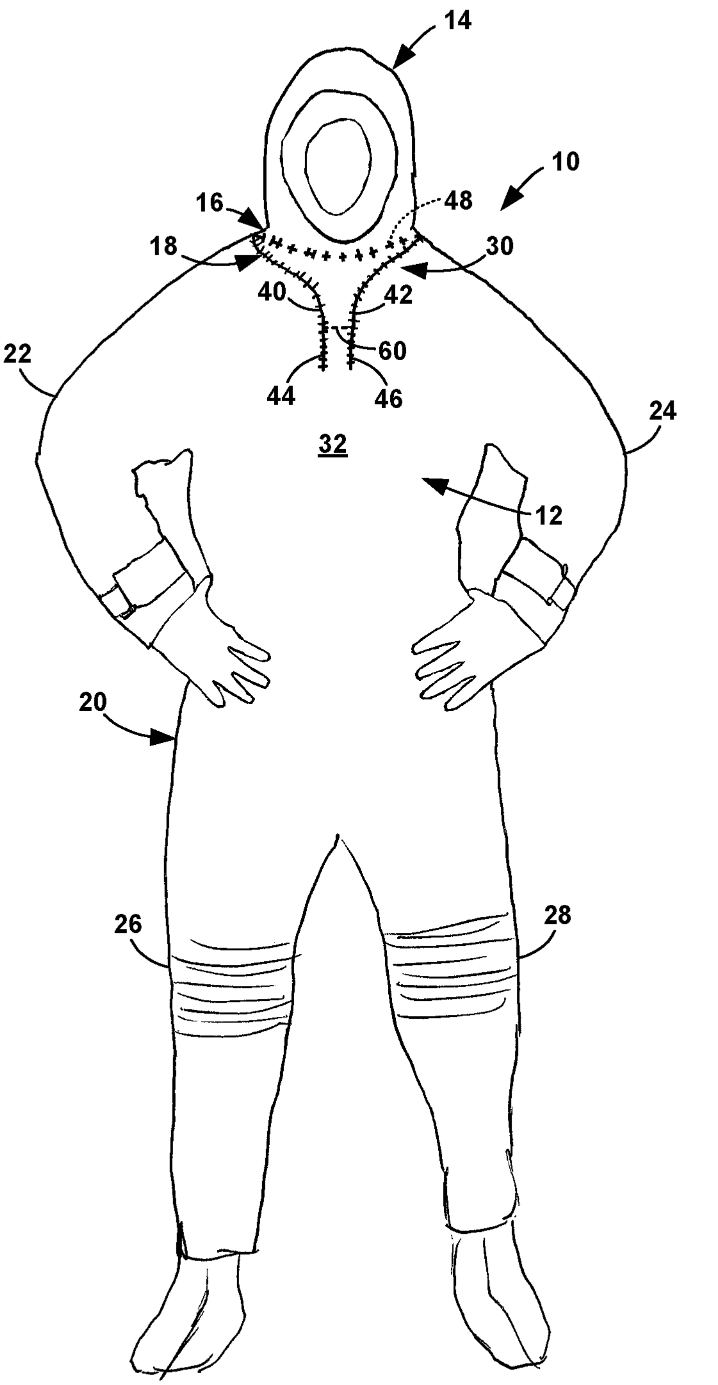
FIG. 1 shows the zipper path of the present invention on the front of a hazmat suit.

The present application hereby incorporates by reference in its entirety U.S. patent application Ser. No. 16/781,289, on which this application is based.

As described above, a hazmat suit is a piece of personal protective equipment comprised of a whole-body garment worn as protection against potentially hazardous chemical, biological, and radiological materials. For purposes of the present invention, the hazmat suit includes a torso 12 and hood 14 that are at connected at a neck 16, and a zipper 18 for opening and closing the suit 10. As described above, a SCBA tank 36 and harness are worn on the outside of the suit 10 with the face piece, regulator, and air tube 38 also on the outside.

The present invention is a unique zipper path 30 for a non-encapsulating hazmat suit 10 that enables cleaner and easier doffing of the suit 10 after technical decontamination is complete.

Figure 2:
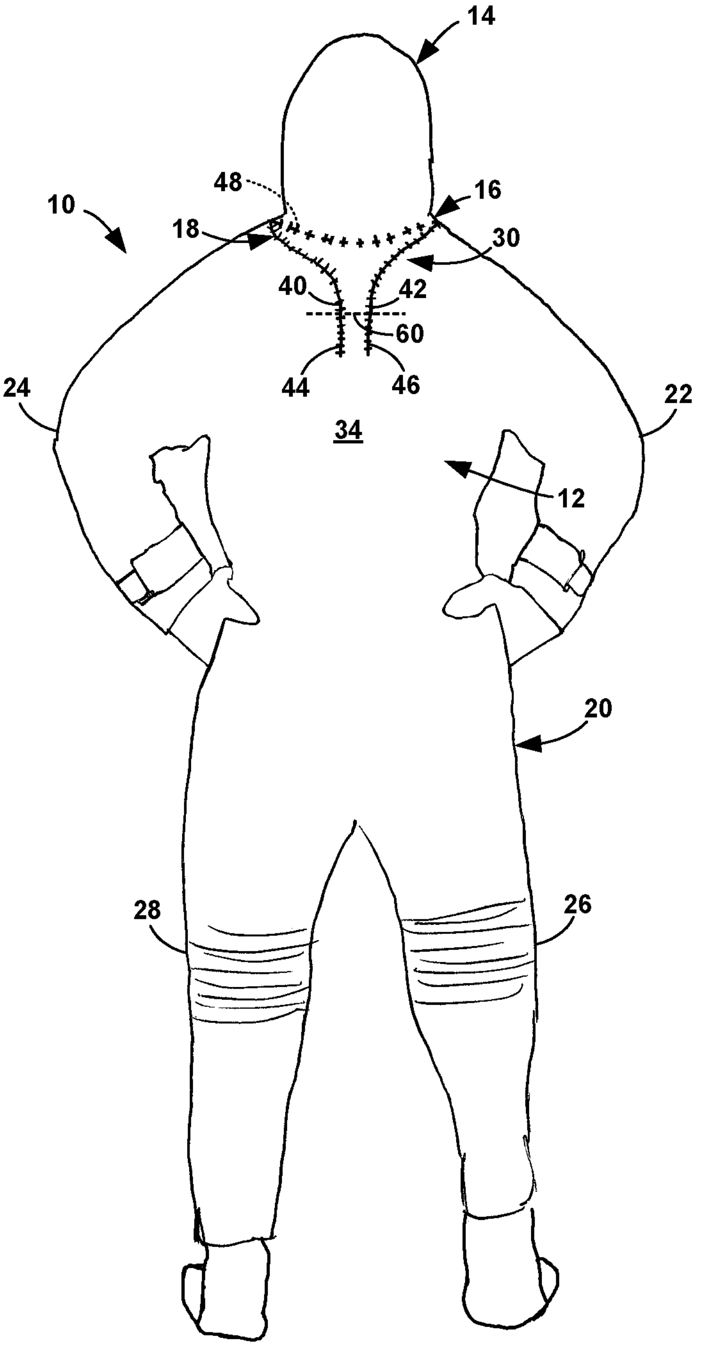
FIG. 2 shows the zipper path of the present invention on the back of a suit.

As shown in FIGS. 1 and 2, the zipper path 30 of the present invention has a first section 40 of the zipper 18 that extends generally vertically on the torso 12 and a second section 42 that extends generally vertically on the torso 12. Both sections 40, 42 curve outwardly, as at 50 and 52 in FIGS. 3 and 4, to each end of a neck section 48 that circles around the suit neck 16, as in FIG. 7. Because of the curves 50, 52, the distance between the first section 40 and second section 42 is smaller than the width 54 of the neck section 48, where the width 54 extends in the direction from shoulder to shoulder.

Figure 7:
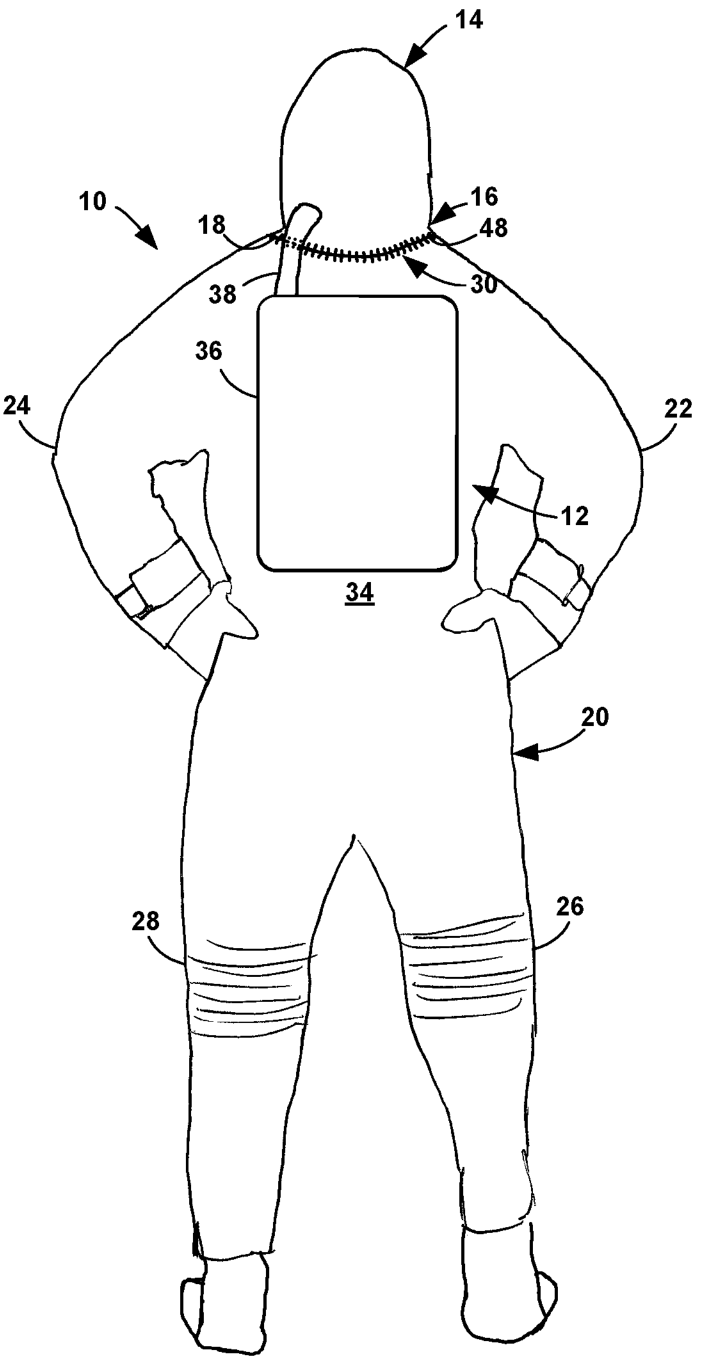
FIG. 7 shows the back of the suit with the zipper path on the front.

In one configuration, shown in FIGS. 1 and 7, the first section 40 and second section 42 are on the front of the torso 12 and the neck section 48 circles around the back of the neck 16. On another configuration, shown in FIG. 2, the first section 40 and second section 42 are on the back of the torso 12 and the neck section 48 circles around the front of the neck 16.

A segment 44 of the first section 40 is in close proximity to a segment 46 of the second section 42, as at 58. The segments 44, 46 can be somewhat long and parallel, as in FIG. 3. Alternatively, the segments 44, 46 can be short, such as in FIG. 4, where the sections 40, 42 run toward each other and then curve away, so that they are in closest proximity for only a very short length of the sections 40, 42.

A cut line 60 extends generally horizontally at least from the first segment 44 to the second segment 46 where the segments 44, 46 are in closest proximity. The cut line 60 may extend only between the segments 44, 46, as in FIG. 1. Alternatively, the cut line 60 may extend beyond the segments 44, 46, as in FIG. 2. The cut line 60 can be an imaginary line or a visible line printed or inscribed on the suit 10. Unless discussed otherwise, references to the cut line 60 are intended to mean only that portion of the line between the segments 44, 46, as in FIG. 1, and nothing outside the segments 44, 46.

The distance 62 between the segments 44, 46, e.g., the length of the cut line 60, is smaller than the width 54 of the neck section 48, which means that only a small number of short snips from a pair of scissors 76 are needed to completely sever the suit 10 along the cut line 60. The number of cuts needed is dependent not only on the length of the cut line 60, but also on the material(s) of which the suit 10 is composed, the thickness of the material(s), and the implement 76 used to cut the suit 10. The material(s) of which the suit 10 is made and the thickness of the suit 10 at the cut line 60 depend on what hazardous material(s) the suit 10 is protecting against.

The minimum length of the cut line 60 is determined by the suit materials and what minimum length is necessary to be able to support the weight of the bottom 20 of the suit 10, which includes the torso 12, arms 22, 24, and legs 26, 28. Typically, the minimum length of the cut line 60 is two inches.

With the above explanation, the length of the cut line 60 is in the range of from about 2 inches to just less than the width 54 of the neck section 48. The neck section width 54 in the typical suit 10 is about 12 inches. A preferred length is shorter than just less than the width 54 of the neck section 48, in the range of from about 2 inches to 9 inches, which would require fewer or shorter cuts and result in the suit 10 being doffed more quickly.

Figure 3:
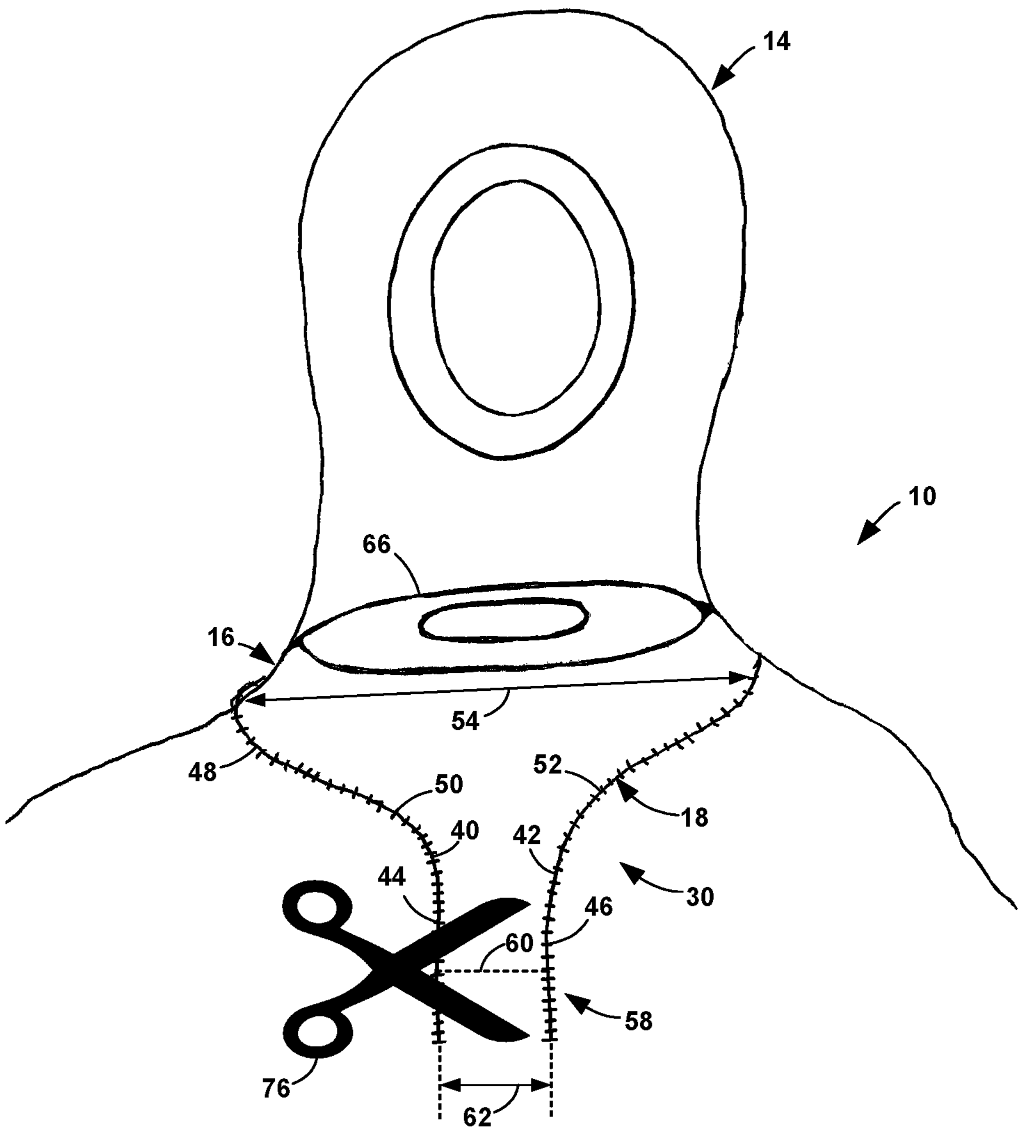
FIG. 3 shows the cut line between segments of the zipper path.
Figure 4:
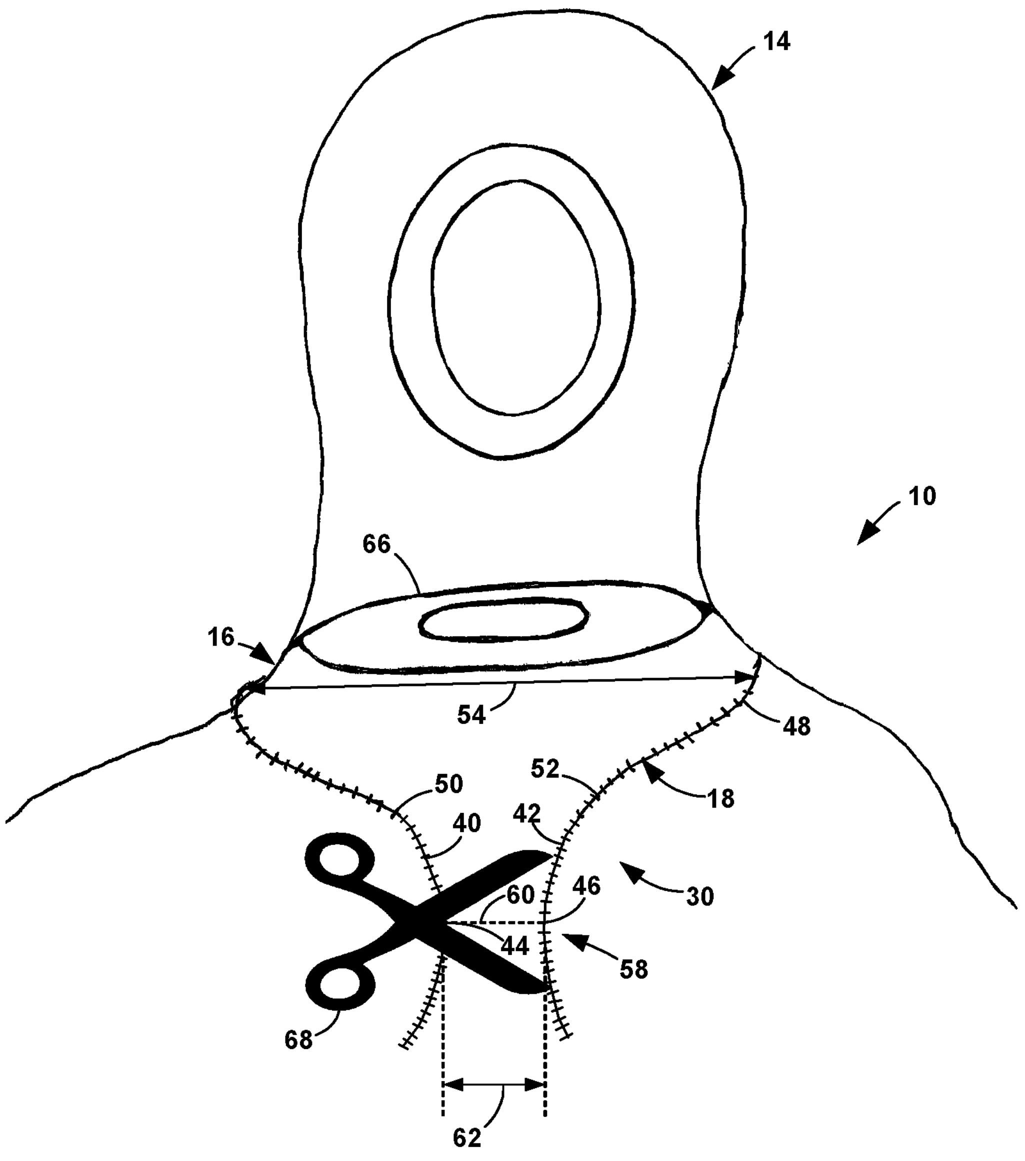
FIG. 4 shows the cut line between alternate segments of the zipper path.

What makes the path 30 unique is that, once the user exits technical decontamination, the zipper 18 can be disengaged and scissors 76 used to quickly cut along the cut line 60 between the segments 44, 46, as shown in FIGS. 3 and 4, to allow the suit bottom 20 to drop away from the user for easy doffing. At this point, the user will still have the suit hood/face piece 14 on with the SCBA 36 or APR/PAPR face piece securely in place and connected to the air supply or filter canister. An optional internal neck gasket 66 can prevent ambient air from reaching the user after the suit 10 is doffed. The entire hood/face piece 14 can easily be removed in one operation, either immediately prior to leaving the technical decontamination area or shortly thereafter.

Figure 5:
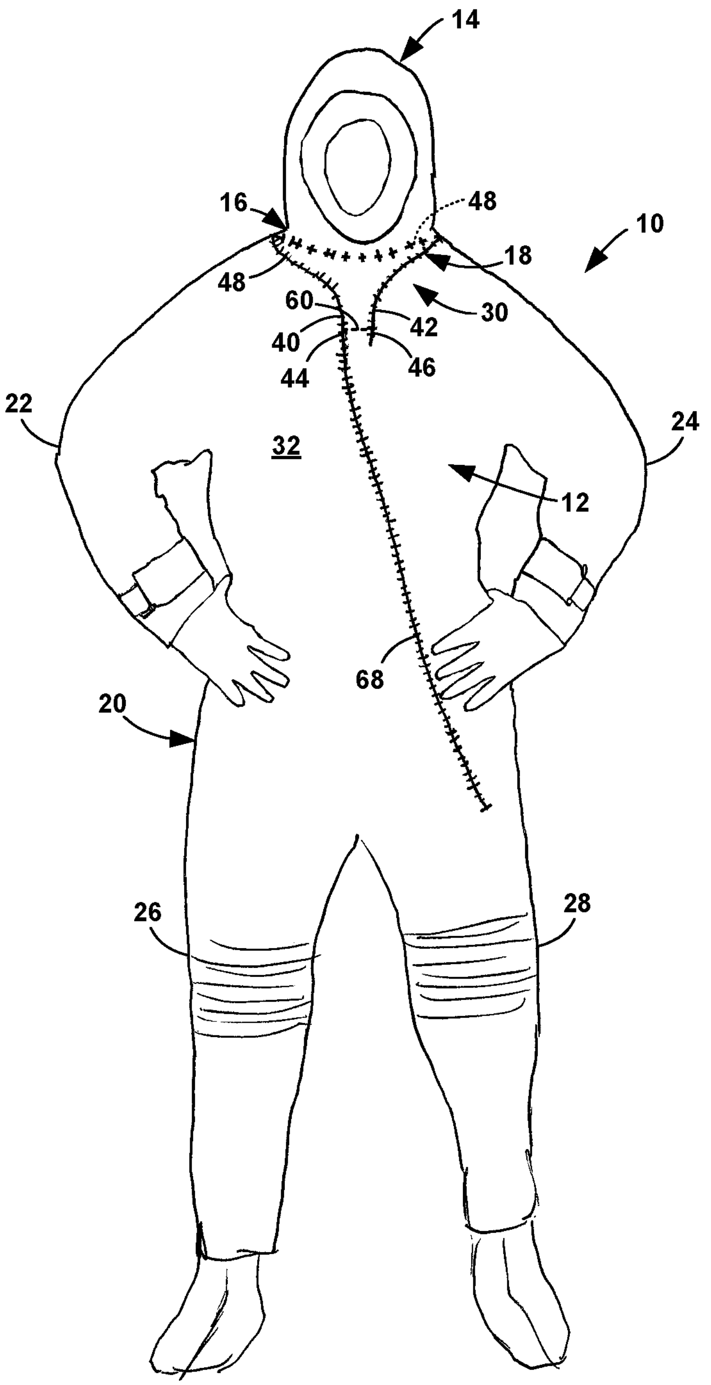
FIG. 5 shows an alternative zipper path.

In order to more easily doff the suit 10, the zipper path 30 can extend downwardly toward the legs 26, 28. For example, one of the sections 40, 42 of the zipper path 30 can extend diagonally down to the opposite leg 26, 28. In FIG. 5, the first section 40 of the zipper path 30 extends diagonally down the torso front 32 to the opposite leg 28, as at 68. The mirror image is also possible, with the second section 42 extending diagonally down the torso front 32 to the opposite leg 26.

Figure 6:
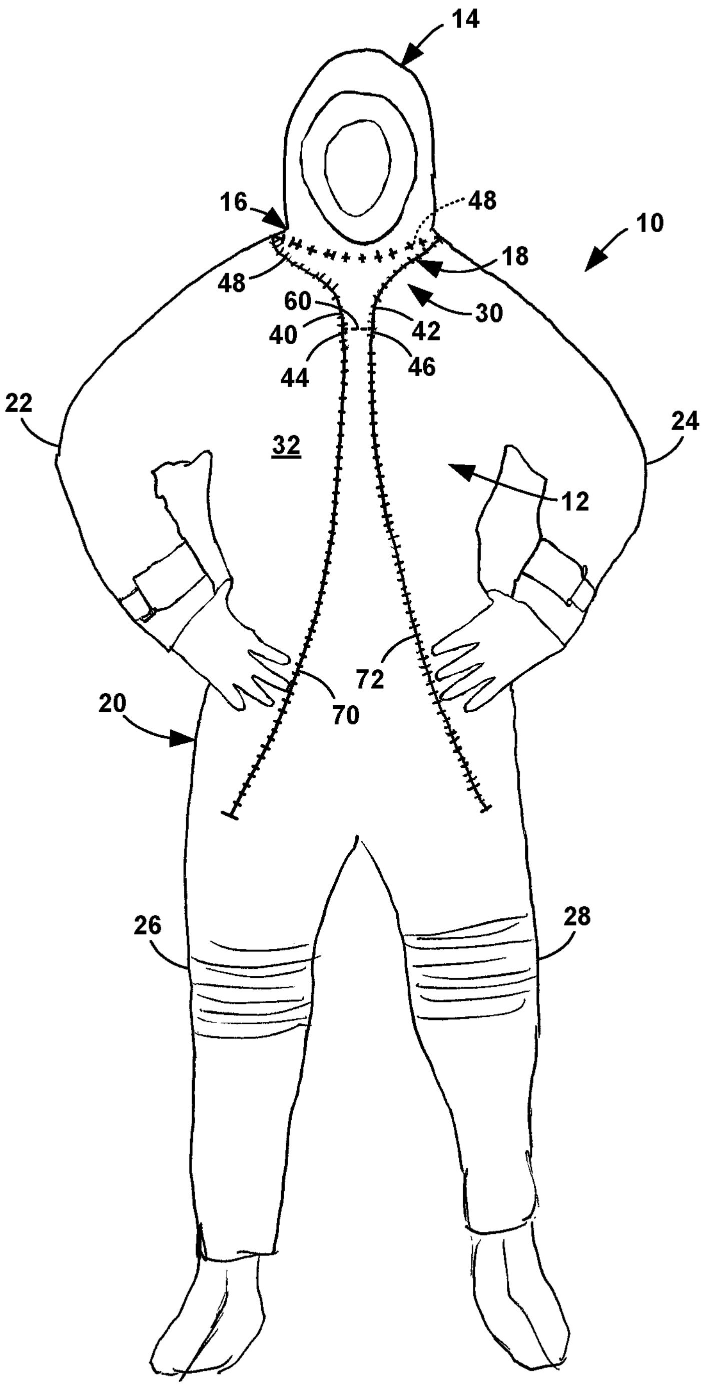
FIG. 6 shows an alternative zipper path.

Alternatively, each section 40, 42 extends downwardly to the leg 26, 28 on the same side. As shown in FIG. 6, the first section 40 extends down the torso front 32 to the leg 26 on the same side, as at 70, and the second section 42 extends down the torso front 32 to the leg 28 on the same side, as at 72.

Any of these extended paths 30 can be on the back 34 of the torso 12 rather than the front 32, incorporating the path 30 of FIG. 2.

The present invention contemplates that any extensions of the sections 40, 42 that ease doffing of the suit 10 can be employed.

Optionally, the zipper 18 has a protective overlap.

In order to doff the suit 10, the zipper 18 is first disengaged (unzipped). Next, the suit 10 is cut with scissors 76 at the cut line 60 to separate the suit bottom 20 from the hood 14. The suit bottom 20 is removed, followed by the hood 14.

Thus, it has been shown and described a zipper path for a hazardous materials protection suit and a method of doffing a hazmat suit. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A method of doffing a non-encapsulating hazardous materials protection suit comprising the steps of:

(a) providing the suit having a self-contained breathing apparatus, a torso and a hood connected at a neck, a bottom having arms, legs, and the torso, and a zipper for opening and closing the suit, the zipper having a path with a first section that extends downwardly on the torso and a second section that extends downwardly on the torso, both sections extending upwardly and curving outwardly to a neck section of the path that circles the neck, the neck section having a width in a direction from shoulder to shoulder, a segment of the first section and a segment of the second section being separated by a horizontal distance that is less than the width of the neck section at a cut line on the torso;

(b) disengaging the zipper;

(c) cutting the cut line to separate the suit bottom from the hood;

(d) removing the suit bottom; and (e) removing the hood.

2. The method of claim 1 wherein the first section and second section are on a front of the torso.

3. The method of claim 1 wherein the first section and second section are on a back of the torso.

4. The method of claim 1 wherein one of the first section and second section extends diagonally downwardly to a front of the leg on an opposite side of a vertical bisecting line of the suit.

5. The method of claim 1 wherein each section extends downwardly to the leg on the same side.

6. The method of claim 1 wherein the zipper has a protective overlap.

7. The method of claim 1 wherein the hood has an internal neck gasket.

* * * * *